US007887063B2

(12) United States Patent
Rueger et al.

(10) Patent No.: US 7,887,063 B2
(45) Date of Patent: Feb. 15, 2011

(54) GASKET FOR SEALING MULTIPLE FLUIDS

(75) Inventors: Ute Rueger, Ann Arbor, MI (US); Kerry Smith, Ann Arbor, MI (US); Bhawani Tripathy, Ann Arbor, MI (US); Thomas Hemmrich, Bloomfield Hills, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 952 days.

(21) Appl. No.: 11/146,735

(22) Filed: Jun. 7, 2005

(65) Prior Publication Data

US 2005/0285353 A1 Dec. 29, 2005

Related U.S. Application Data

(60) Provisional application No. 60/577,712, filed on Jun. 7, 2004.

(51) Int. Cl.
F02F 11/00 (2006.01)
(52) U.S. Cl. .......................... 277/596; 277/594
(58) Field of Classification Search .......... 277/591–596
See application file for complete search history.

(56) References Cited

U.S. PATENT DOCUMENTS

| | | | |
|---|---|---|---|
| 3,957,279 A | | 5/1976 | Belter |
| 4,293,663 A | | 10/1981 | Stivers |
| 4,559,688 A | | 12/1985 | Abu-Isa et al. |
| 4,876,315 A | | 10/1989 | Hoyt et al. |
| 5,116,558 A | | 5/1992 | Wrobel et al. |
| 5,157,081 A | | 10/1992 | Puydak et al. |
| 5,217,797 A | | 6/1993 | Knox et al. |
| 5,368,315 A | * | 11/1994 | Viksne ........................ 277/592 |
| 5,459,202 A | | 10/1995 | Martinex et al. |
| 5,783,631 A | | 7/1998 | Venkataswamy |
| 5,807,639 A | | 9/1998 | Frappier et al. |
| 6,070,882 A | * | 6/2000 | Abe et al. ..................... 277/592 |
| 6,073,938 A | * | 6/2000 | Abe et al. ..................... 277/654 |
| 6,129,360 A | * | 10/2000 | Walker et al. ................ 277/592 |
| 6,346,300 B1 | | 2/2002 | Ruepping et al. |
| 6,413,354 B1 | * | 7/2002 | Haas et al. .................... 156/329 |
| 6,447,916 B1 | | 9/2002 | Van Gool |

(Continued)

FOREIGN PATENT DOCUMENTS

EP 0 995 777 4/2000

(Continued)

Primary Examiner—Shane Bomar
Assistant Examiner—Gilbert Y Lee
(74) Attorney, Agent, or Firm—Robert L. Stearns; Dickinson Wright, PLLC

(57) ABSTRACT

The subject invention provides a gasket for sealing multiple fluids and a method of forming the gasket. The gasket includes a carrier, a first elastomeric material, and a second elastomeric material different than the first elastomeric material. The first and second elastomeric materials are disposed in contact with the carrier in a flowable state such that the first and the second materials flow together to form a third elastomeric material comprising a mixture of the first and second elastomeric materials. The first and second elastomeric materials include cure systems that are compatible to ensure sufficient bonding within the third elastomeric material. Adhesive materials that are compatible with each of the first, second, and third elastomeric materials and the carrier are used to bond the elastomeric materials to the carrier.

18 Claims, 4 Drawing Sheets

U.S. PATENT DOCUMENTS

| | | |
|---|---|---|
| 6,624,251 B1 | 9/2003 | Chmielewski |
| 6,673,455 B2 | 1/2004 | Zumbrum et al. |
| 6,779,801 B2 | 8/2004 | Grant-Acquah et al. |
| 6,787,221 B2 | 9/2004 | Botrie et al. |
| 7,278,639 B2 * | 10/2007 | Forry et al. ............. 277/596 |
| 2003/0087053 A1 | 5/2003 | Fukushi |
| 2003/0230856 A1 * | 12/2003 | Forry et al. ............. 277/592 |
| 2004/0024133 A1 | 2/2004 | Hetherington |
| 2004/0113320 A1 | 6/2004 | Guerin |
| 2004/0132912 A1 * | 7/2004 | McElwee ............. 525/326.1 |
| 2004/0157035 A1 * | 8/2004 | Guizzetti et al. ......... 428/66.6 |
| 2004/0265559 A1 | 12/2004 | Rustemeyer et al. |
| 2005/0065264 A1 | 3/2005 | Pazur |
| 2005/0098962 A1 * | 5/2005 | Duclos et al. ............. 277/628 |
| 2005/0101737 A1 | 5/2005 | Pazur et al. |
| 2005/0269788 A1 * | 12/2005 | Grunfeld ............. 277/592 |

FOREIGN PATENT DOCUMENTS

| | | |
|---|---|---|
| EP | 0 857 757 | 8/2003 |
| EP | 1 506 978 | 2/2005 |
| WO | WO 93/23226 | 11/1993 |
| WO | WO 99/22922 | 5/1999 |
| WO | WO 00/59999 | 10/2000 |
| WO | WO 2004/103677 | 12/2004 |

* cited by examiner

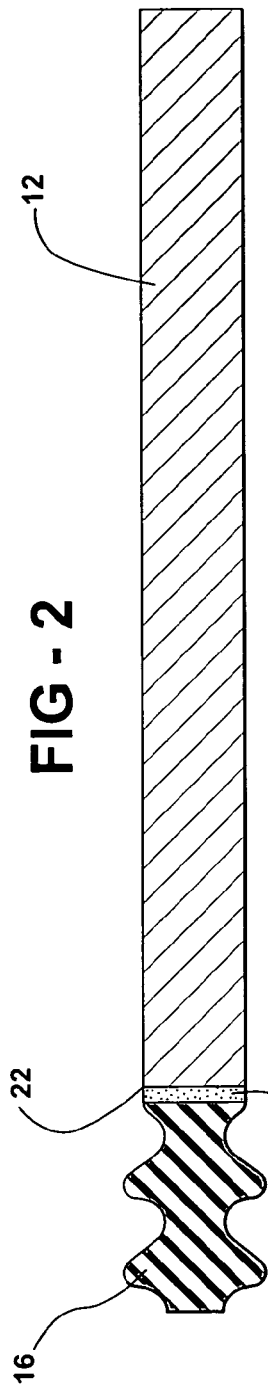
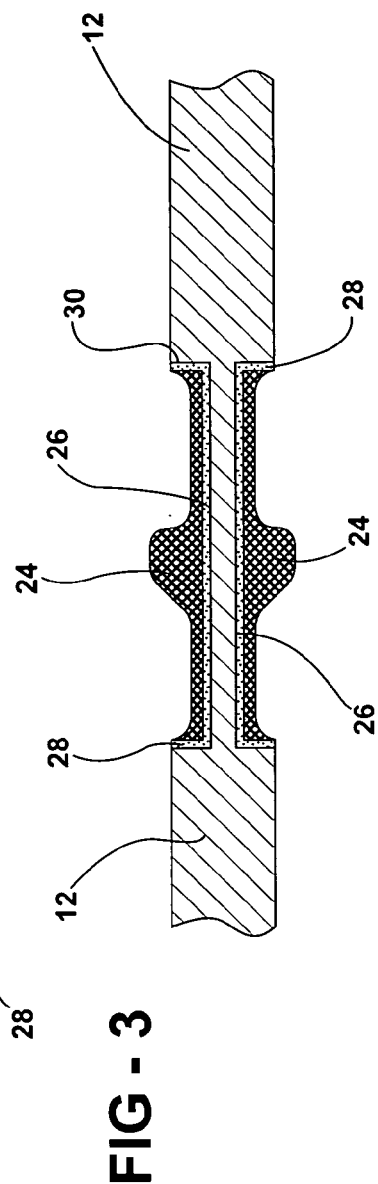
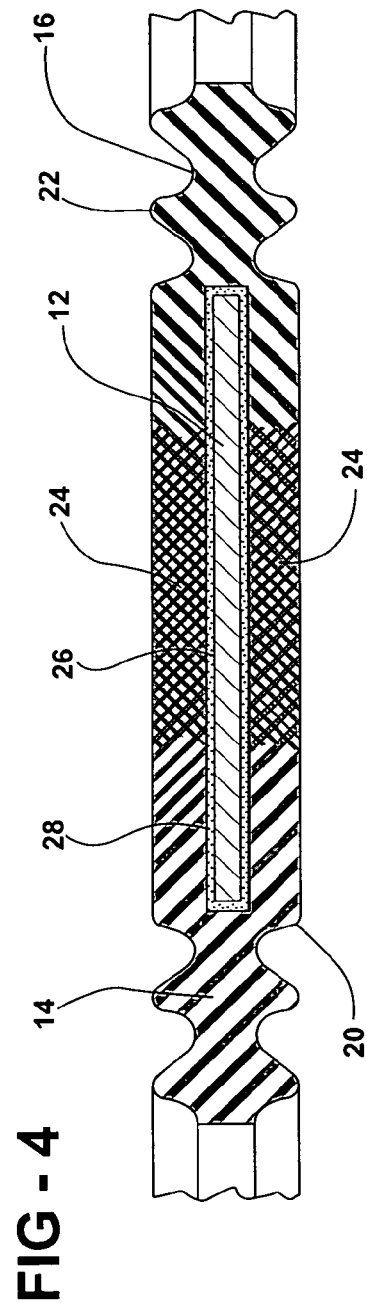
FIG - 2
FIG - 3
FIG - 4

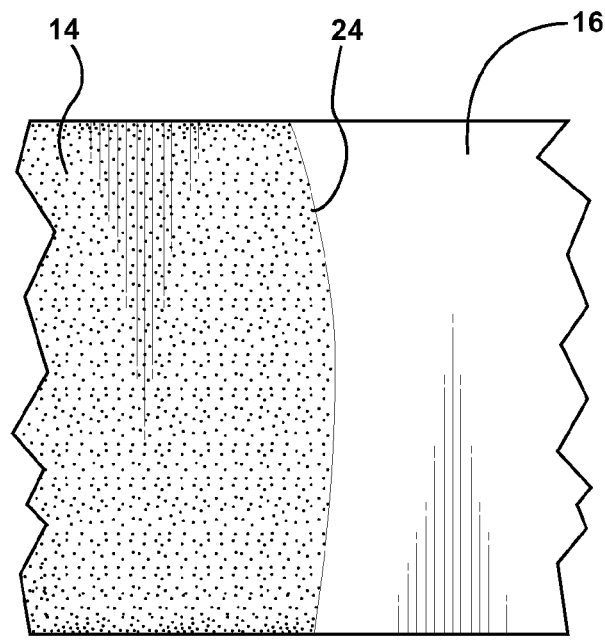
FIG - 5
FIG - 6
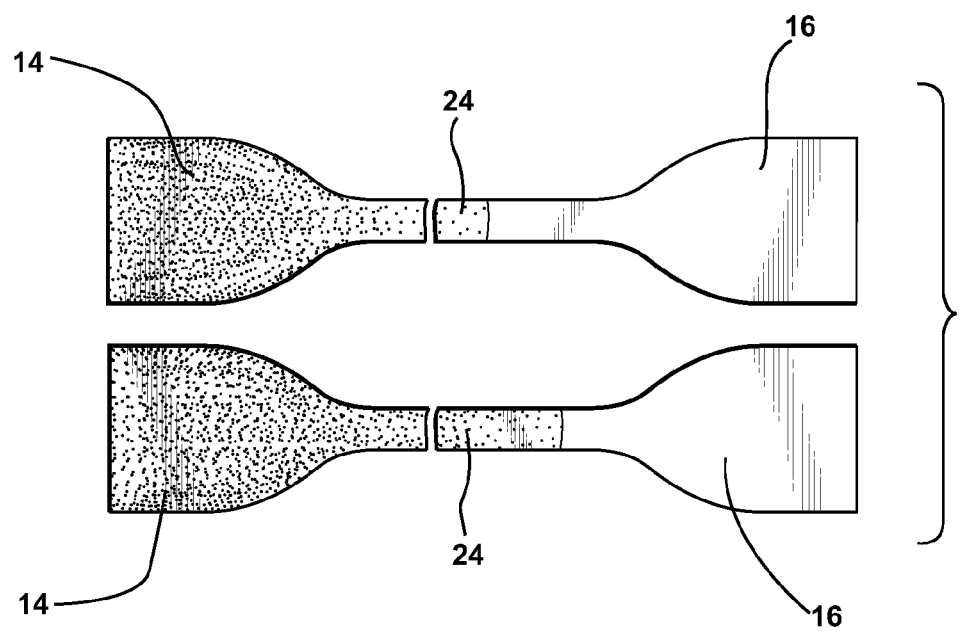

GASKET FOR SEALING MULTIPLE FLUIDS

CROSS REFERENCE TO RELATED APPLICATION

This application claims the benefit of U.S. Provisional Patent Application Ser. No. 60/577,712 filed Jun. 7, 2004.

BACKGROUND OF THE INVENTION

1. Field of the Invention

The subject invention relates to gaskets for use in static sealing applications, such as engine, transmission, axle, other similar powertrain sealing applications, and more specifically to gaskets for use in sealing multiple fluids.

2. Description of the Related Art

Injection molded gaskets fabricated of rubber and the like are known for installation within an engine for sealing fluids and preventing leaks. The related art gaskets are typically formed from a first material and a second material spaced from one another and these materials are supported on a carrier. During formation, the materials are formed in a mold separate from one another such that the materials are not in contact. Most typically, one material is formed first and then the second material is formed thereafter. The first and the second materials are generally elastomeric or thermoset materials.

These first and second materials cure at different rates. Once one material has completely cured, it is very difficult to have another material bond to the cured material without the use of additional adhesives, or bonding agents. If additional adhesives are used between the materials, then the bond that is formed between the cured material and the adhesive is weak. Thus, the gasket has an increased likelihood of failing at the bond where the adhesive is located. Such failure of the gasket results in leakage of the fluids which may result in damage to the engine.

It is well known that certain materials are better suited to seal certain fluids than are other materials. For example, a hydrogenated nitrile rubber elastomer is particularly suited for sealing a coolant fluid and fluoroelastomer is particularly suited for sealing an air/fuel mixture. While each of these materials may seal the other fluid, they are not best suited to do so and may result in premature failure. Manufacturers of gaskets to seal multiple fluids have sacrificed the ability to seal the fluids by employing a single material that is not best suited for any of the fluids. As an illustration, it is common to use silicone materials on a gasket to simultaneously seal three fluids, namely, an air/fuel mixture, a coolant, and oil. As engine performance and demands continue to increase, the gaskets are exposed to higher temperatures and to a more chemically aggressive environment. Such silicone materials may continue to work to seal multiple fluids; however, these higher temperatures and increasingly chemically aggressive environments will shorten the useful life of such gaskets that have materials that are not suited for such applications.

SUMMARY OF THE INVENTION

The subject invention provides a gasket for sealing multiple fluids. The gasket includes a carrier having a plurality of fluid openings to be sealed by a first elastomeric material and a second elastomeric material that is different than the first elastomeric material. The first elastomeric material is disposed on the carrier in a first region and the second elastomeric material is disposed on the carrier in a second region adjacent the first region. A third elastomeric material comprises a blend of the first and second elastomeric materials and is disposed on the carrier in a third region between the first and second regions. An adhesive material compatible with each of the elastomeric materials and the carrier is disposed between each of the elastomeric materials and the carrier for bonding the elastomeric materials to the carrier.

The subject invention further provides a method of forming the gasket. The method comprises providing the carrier and the first and second elastomeric materials. The first and second elastomeric materials are simultaneously disposed onto the carrier in the first region and the second region to form a third elastomeric material comprising a blend of the first and second elastomeric materials in a third region between the first and second regions.

The gasket formed according to the subject invention is suited for sealing multiple different fluids with materials that are best suited for each of the particular fluids. Further, the gasket has a reduced likelihood of failure as the first, second, and third elastomeric materials are bonded to the carrier with the adhesive material that is compatible with each of the three elastomeric materials. Another advantage is that the gasket does not require additional bonding agents between the first and the second elastomeric materials. Further, the two materials have compatible cure rates and the bond therebetween is sufficiently strong to prevent failure of the gasket, when cured simultaneously.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a cross-sectional view taken along line 2-2 in FIG. 1 of the second elastomeric material bonded to a carrier with an adhesive material;

FIG. 3 is a cross-sectional view taken along line 3-3 in FIG. 1 of the third elastomeric material bonded to the carrier with the adhesive material;

FIG. 4 is a cross-sectional view taken along line 4-4 in FIG. 1 through each of the first, second, and third elastomeric materials;

FIG. 5 is a top view of a sample elastomeric sheet formed from the first, second, and third elastomeric materials;

FIG. 6 is a top view of test specimens cut from the elastomeric sheet after the specimens have fractured.

DETAILED DESCRIPTION OF THE INVENTION

Figure 1:
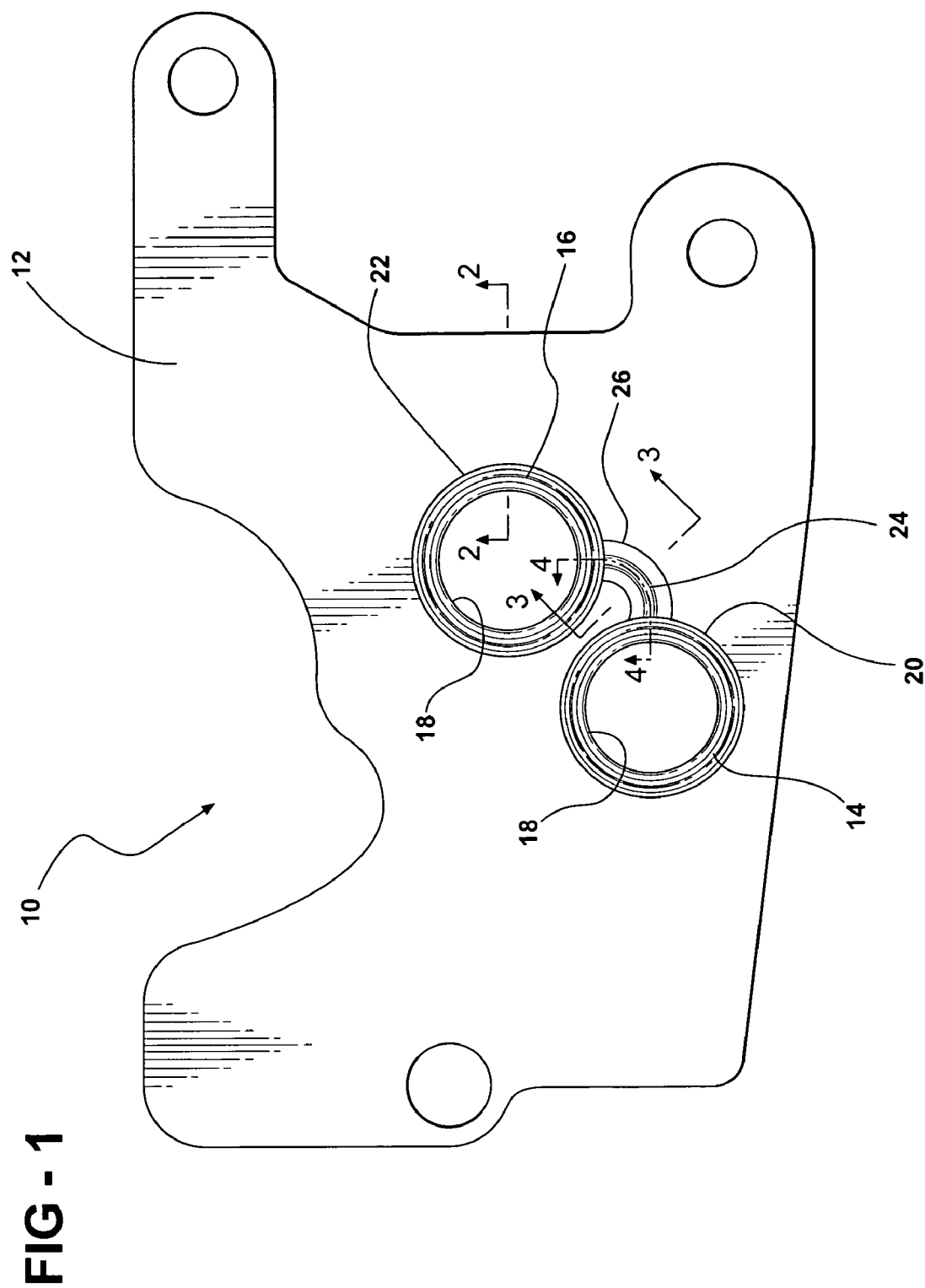
FIG. 1 is a top view of gasket having a plurality of fluid openings to be sealed by a first, second, and third elastomeric materials.

A gasket for sealing multiple fluids is shown generally at 10 in FIG. 1. Various gaskets are known to those of ordinary skill art for use in engines and other powertrain systems between parts to prevent leakage of engine oil, coolant, transmission oil, air/fuel mixtures, brake fluid, axle/gear lubes, and the like. Further, other gaskets are used between parts to seal multiple different types of fluids. For example, an intake manifold gasket may seal an air/fuel mixture, a coolant mixture, and an oil mixture. Different types of fluid being sealed with a single gasket 10 can present difficult sealing issues, especially when only a single material is used on the gasket 10 to seal the multiple fluids, as described above. It has become apparent that using a single material with higher performance engines that operate at higher temperatures and within a more chemically aggressive environment is not satisfactory. Some fluids are highly chemically aggressive while others are slightly chemically aggressive and still others are not chemically aggressive. Some fluids may have a very high operating temperature while others do not. Therefore, the subject invention provides the gasket 10 with materials selected to seal the particular fluid without sacrificing sealing or adhesive qualities. It is to be appreciated that the subject invention may be employed with any gasket 10 that may seal multiple different fluids.

The gasket 10, formed according to the subject invention, includes a carrier 12, a first elastomeric material 14, and a second elastomeric material 16. The carrier 12 has a plurality of fluid openings 18 to be sealed and is exposed to multiple different fluids, which are shown best in FIG. 1. The carrier 12 may be formed from at least one of a metal material, a thermoplastic material, and a thermoset material. For applications that are exposed to higher temperatures or more chemically aggressive environments, the metal material may be selected as the carrier 12. Alternatively, the plastic material may be selected for lower temperature applications. It is to be appreciated that other materials, other than metal, thermoplastic, or thermoset materials, may be used with the subject invention.

The first elastomeric material 14 and the second elastomeric material 16 are disposed simultaneously in contact with the carrier 12 in an uncured state. The first and second elastomeric materials 14, 16 are compatible to form a strong bond therebetween and to prevent a weak area from being present in the gasket 10. The first elastomeric material 14 is disposed on the carrier 12 in a first region 20. The first elastomeric material 14 is selected from at least one of fluoroelastomer, hydrogenated nitrile rubber, nitrile rubber, silicone rubber, epichlorohydrin, ethylene propylene diene, polyacrylate, ethylene acrylic dipolymer elastomer, and ethylene acrylic terpolymer elastomer. For example, the first elastomeric material 14 may be a fluoroelastomer (FKM). The first elastomeric material 14 may also include a mixture of the polyacrylate and the epichlorohydrin.

The second elastomeric material 16 is different than the first elastomeric material 14 and is disposed on the carrier 12 in a second region 22 adjacent the first region 20. Referring to FIG. 2, a cross-sectional view of the second elastomeric material 16 disposed on the carrier 12 is illustrated. The second elastomeric material 16 is selected from at least one of fluoroelastomer, hydrogenated nitrile rubber, nitrile rubber, silicone rubber, epichlorohydrin, ethylene propylene diene, polyacrylate, ethylene acrylic dipolymer elastomer, and ethylene acrylic terpolymer elastomer. For example, the second elastomeric material 16 may be a hydrogenated nitrile rubber (HNBR). The second elastomeric material 16 may also include a mixture of the ethylene propylene diene and the silicone rubber.

The first and second elastomeric materials 14, 16 blend to form a third elastomeric material 24 as the first and second elastomeric materials 14, 16 are disposed on the carrier 12. The first and the second elastomeric materials 14, 16 flow into a third region 26 between the first and second regions 20, 22 to form the third elastomeric material 24. Referring to FIG. 3, a cross-sectional view of the third elastomeric material 24 is illustrated. Therefore, if the first elastomeric material 14 is FKM and the second elastomeric material 16 is HNBR, then the third elastomeric material 24 is a mixture of FKM and HNBR. The third elastomeric material 24 may be a non-homogenous mixture such that some areas include more FKM than HNBR, while others include more HNBR than FKM. In other words, the third elastomeric region 24 begins where the mixtures of the first and second elastomeric materials 14, 16 occur.

With reference to FIG. 4, a cross-sectional view taken along line 4-4 in FIG. 1 is illustrated. On the left most side of FIG. 4 is the first elastomeric material 14 and on the right most side of FIG. 4 is the second elastomeric material 16. As the first and second elastomeric materials 14, 16 flow together, the third elastomeric material 24 is shown as between the first and second elastomeric materials 14, 16.

Each of the first and the second elastomeric materials 14, 16 has a cure system. The cure system is selected from at least one of a soap-sulfur cure system, a sulfur cure system, an addition cure system, an onium cure system, a dihydroxy cure system, a triazine cure system, an iso-cyanuric cure system, a peroxide cure system, and a bisphenol cure system. The cure systems of the first and the second elastomeric materials 14, 16 are compatible to form the third elastomeric material 24. The term compatible is intended to indicate that the first and the second elastomeric materials 14, 16 will sufficiently bond with one another when cured in contact with another such that additional adhesives are not needed. For example, the cure system of the first elastomeric material 14 may be substantially identical to the cure system of the second elastomeric material 16, i.e., both cure systems are a peroxide cure system. The cure system impacts the rate of cure of the first and second elastomeric materials 14, 16. Therefore, it is desirable that the first and the second elastomeric materials 14, 16 have a similar rate of cure as well such that one of the materials does not prematurely cure before the other.

Referring again to FIGS. 2-4, an adhesive material 28 that is compatible with each of the elastomeric materials 14, 16, 24 and the carrier 12 is used to bond the elastomeric materials 14, 16, 24 to the carrier 12. Additionally, more than one adhesive may be used to ensure that an adequate bond has been formed between the various regions. One difficulty in providing different materials on one gasket 10 is to ensure that the specific materials for each of the fluids is adequately bonded to the gasket 10. Therefore, the adhesive material 28 needs to be compatible with the elastomeric materials. For example, the adhesive materials may be disposed selectively onto the carrier between regions of the elastomeric materials and the carrier region. As another example, the adhesive material may be selected such that it is compatible with each of the three regions so only a single adhesive material is applied to the carrier. The adhesive material 28 is selected from at least one of a silane adhesive, a phenolic adhesive, and an epoxy adhesive. For example, when the first elastomeric material 14 is FKM, the second elastomeric material 16 is HNBR, and the third elastomeric material 24 is a FKM/HNBR blend, the adhesive material 28 may be a silane adhesive.

In addition to the first and second elastomeric materials 14, 16 being applied in the uncured stated, the adhesive material 28 is also applied to the carrier 12 in an uncured state. When the elastomeric materials 14, 16, 24 and the adhesive material 28 are cured, the elastomeric materials 14, 16, 24 and the adhesive material 28 cure simultaneously and in direct contact with one another to ensure an adequate bond is formed between the elastomeric materials 14, 16, 24 and the carrier 12. Since the curing is occurring simultaneously, there is a reduced or eliminated likelihood that the elastomeric materials 14, 16, 24 will become unbonded from the carrier 12 and develop leaks.

Referring back to FIG. 1, one example of the gasket 10 is illustrated. The first and second regions 20, 22 are spaced from one another and positioned adjacent different fluid openings 18 for sealing different fluids. The first and second elastomeric materials 14, 16 are shown extending about the fluid openings 18 to create a seal therebetween in a generally circular shape. The first elastomeric material 14 in the first region 20 seals a first fluid and the second elastomeric material 16 in the second region 22 seals a second fluid different from the first fluid. The third region 26 is shown as interconnecting the first and second regions 20, 22 in a generally elbow shape. The third region 26 may have any shape depending upon the application of the gasket 10, i.e., the third region 26 may be straight, curvy, or wavy.

Referring back to FIG. 3, a cross-sectional view of the third region 26 is shown. The third region 26 has a groove 30 interconnecting the first region 20 and the second region 22. The groove 30 may be a thin layer of the carrier 12, a web, or the like. The first and second elastomeric materials 14, 16 flow into the groove 30 and intermix to form the third elastomeric material 24. The third elastomeric material 24 in the third region 26 seals a third fluid different from the first and second fluids. In one embodiment, the gasket 10 is for an intake manifold and the first fluid is an air/fuel mixture, the second fluid is a coolant mixture, and the third fluid is an oil mixture.

The subject invention also provides a method of forming the gasket 10. The method comprises providing the carrier 12, the first elastomeric material 14, and the second elastomeric material 16. To form the gasket 10, the first elastomeric material 14 and the second elastomeric material 16 are simultaneously disposed in a flowable state onto the carrier 12 in the first region 20 and the second region 22. As the first and second elastomeric materials 14, 16 flow, the third elastomeric material 24 is formed comprising the blend of the first and second elastomeric materials 14, 16 in the third region 26 between the first and second regions 20, 22.

Co-injection molding may be used to form the elastomeric materials 14, 16, 24. The carrier 12 is positioned within an mold (not shown) and the first and second elastomeric materials 14, 16 are simultaneously injected, which may be at a non-laminar flow rate. The non-laminar flow allows the first and second elastomeric materials 14, 16 to sufficiently mix and blend to form the third elastomeric material 24. As the first and second elastomeric materials 14, 16 flow toward one another, the third elastomeric material 24 becomes the non-homogenous mixture of the first and second elastomeric materials 14, 16.

Prior to the disposition of the first and second elastomeric materials 14, 16 into contact with the carrier 12, the adhesive material 28 is disposed onto the carrier 12. The adhesive material 28 may be disposed in only those locations where the first, second, and third elastomeric materials 14, 16, 24 may be or the adhesive material 28 may coat the entire carrier 12. It is to be appreciated by those of ordinary skill in the art that the carrier 12 may be prepped as required by the specific application, such as by coating the carrier 12 with a corrosion resistant layer.

After the disposition of the first and second elastomeric materials 14, 16 into contact with the carrier 12, the elastomeric materials 14, 16, 24 and the adhesive material 28 are cured at simultaneously the same time and in direct contact with one another. The injection molding process requires the first and second elastomeric materials 14, 16 to be heated to a flowable state, which occurs at elevated temperatures. Once the first and second elastomeric materials 14, 16 are disposed on the carrier 12, the gasket 10 is cured at about 325° F. to about 400° F. for 30 seconds to 300 seconds.

Referring to FIG. 5, a sample elastomeric sheet is illustrated formed of the first and the second elastomeric materials 14, 16 to test the adhesion between the first, second, and third elastomeric materials 14, 16, 24. The elastomeric sheet was formed at laminar flow rates in order to test the adhesion between the first and second elastomeric materials 14, 16. From the sample elastomeric sheet, sample parts are cut into dumb bell shape specimens and are subjected to a stress-strain test until failure without the carrier 12 being present. No additional adhesives or bonding agents are required to provide a sufficient bond between the first, second, and third elastomeric materials 14, 16, 24. The stress-strain test subjected the specimens to a strain rate of 0.25 inches per minute and in accordance with ASTM D-412. The first elastomeric material 14 on the left side of the parts is FKM and the second elastomeric material 16 on the right side of the parts is HNBR and both materials have a peroxide cure system. The below table sets forth the results of the stress-strain test for pure FKM sample, a pure HNBR sample, and two samples of the mixed FKM and HNBR

| ASTM D 412, Die C, Cross-Head Speed 0.25"/min | FKM | HNBR | FKM/HNBR I | FKM/HNBR II |
|---|---|---|---|---|
| Tensile Strength [MPa] | 9.2 | 14.5 | 6.8 | 5.9 |
| Ultimate Elongation [%] | 416 | 270 | 252 | 248 |
| Tensile Stress at 25% Elongation [MPa] | 1 | 0.7 | 0.8 | 0.8 |
| Tensile Stress at 50% Elongation [MPa] | 1.4 | 1.1 | 1.2 | 1.2 |
| Tensile Stress at 100% Elongation [MPa] | 2 | 2.4 | 2.1 | 2.1 |

Figure 7:
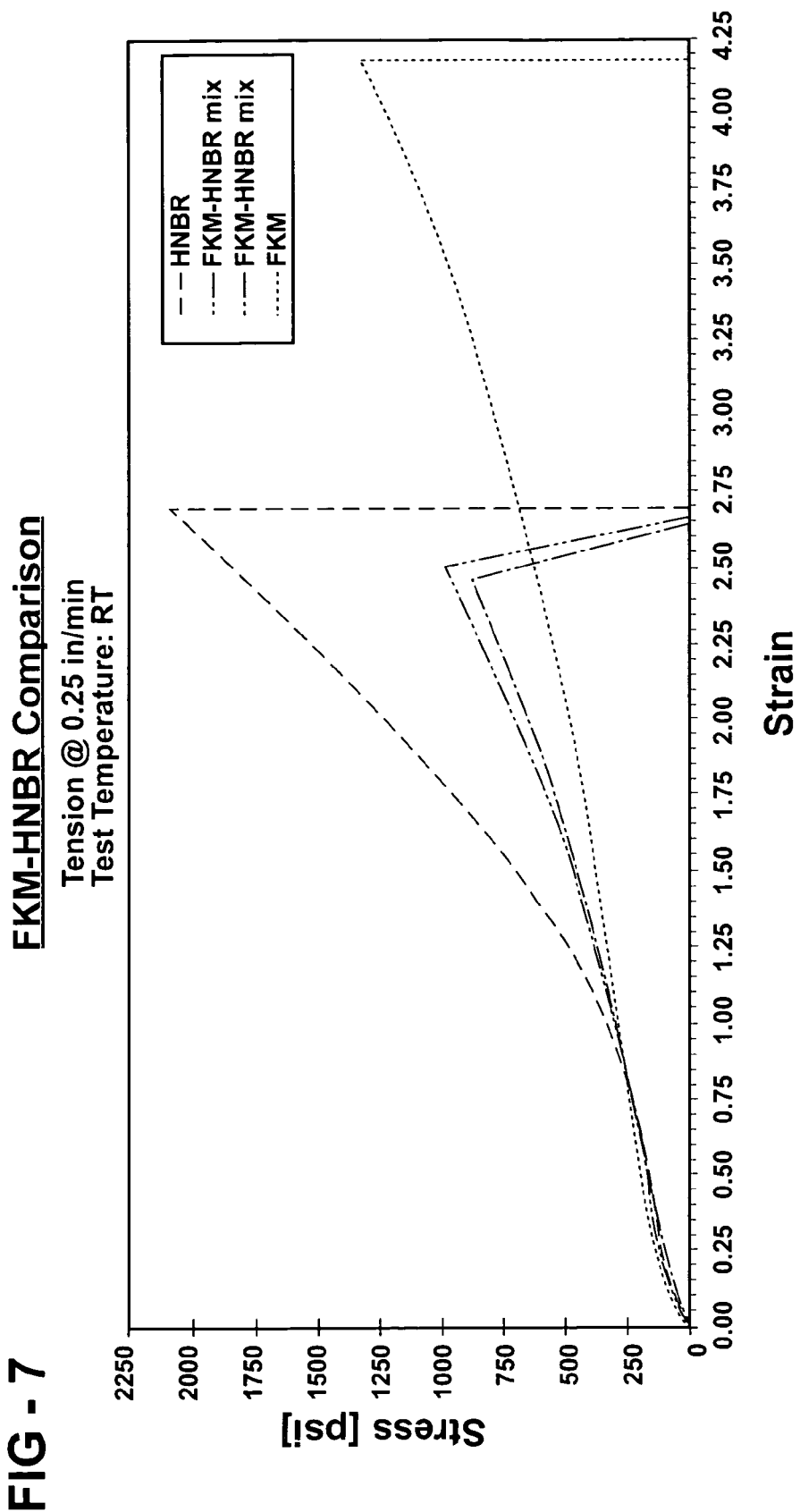
FIG. 7 is graphical illustration of a stress-strain curve for the test specimens of FIG. 6.

FIG. 6 illustrates the elastomeric parts after failure and it is evident that the failure did not occur in the third elastomeric material 24, but occurred only in the FKM. FIG. 7 is a graphical illustration of the resulting stress-strain curve. From the above table, pure FKM has a tensile strength of less than HNBR, so if the third elastomeric material 24 is adequately bonded, the break should occur in the FKM pure material and not in the third elastomeric material 24. Therefore, since the failure occurred in the first elastomeric material 14, this indicates that the materials have sufficiently bonded to one another to prevent failure within the third elastomeric material 24.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gasket for sealing multiple fluids comprising:
   a carrier having a plurality of fluid openings to be sealed including first and second fluid openings spaced from one another;
   a first elastomeric material disposed on a first region of said carrier and surrounding said first fluid opening;
   a second elastomeric material different than said first elastomeric material disposed on a second region of said carrier spaced from said first region and surrounding said second fluid opening;

a third elastomeric material comprising a blend of said first and second elastomeric materials disposed on a third region of said carrier extending between said first and second regions and interconnecting said first elastomeric material and said second elastomeric material such that only said first elastomeric material surrounds said first fluid opening and only said second elastomeric material surrounds said second fluid opening; and an adhesive material compatible with said elastomeric materials and said carrier and disposed between each of said elastomeric materials and said carrier for bonding said elastomeric materials to said carrier.

2. A gasket as set forth in claim 1 wherein said adhesive material is selected from at least one of a silane adhesive, a phenolic adhesive, and an epoxy adhesive such that said adhesive material sufficiently bonds each of said elastomeric materials to said carrier.

3. A gasket as set forth in claim 2 wherein said adhesive material further comprises a plurality of adhesive materials to bond each of said elastomeric materials to said carrier.

4. A gasket as set forth in claim 1 wherein said first and second elastomeric materials and said adhesive material are concurrently in an uncured state.

5. A gasket as set forth in claim 4 wherein said elastomeric materials and said adhesive material are in direct contact with one another.

6. A gasket as set forth in claim 1 wherein said first elastomeric material is selected from at least one of fluoroelastomer, hydrogenated nitrile rubber, nitrile rubber, silicone rubber, epichlorohydrin, ethylene propylene diene, polyacrylate, ethylene acrylic dipolymer elastomer, and ethylene acrylic terpolymer elastomer.

7. A gasket as set forth in claim 6 wherein said second elastomeric material is selected from at least one of fluoroelastomer, hydrogenated nitrile rubber, nitrile rubber, silicone rubber, epichlorohydrin, ethylene propylene diene, polyacrylate, ethylene acrylic dipolymer elastomer, and ethylene acrylic terpolymer elastomer.

8. A gasket as set forth in claim 1 wherein said first elastomeric material is a fluoroelastomer.

9. A gasket as set forth in claim 8 wherein said second elastomeric material is a hydrogenated nitrile rubber.

10. A gasket as set forth in claim 9 wherein each of said first and said second elastomeric materials further comprise a peroxide cure system.

11. A gasket as set forth in claim 10 wherein said adhesive material is further defined as a silane adhesive.

12. A gasket as set forth in claim 1 wherein said carrier is further defined as being formed from at least one of a metal material, a thermoplastic material, and a thermoset material.

13. The gasket of claim 1 wherein said blend is not homogenous.

14. The gasket of claim 1 wherein said first elastomeric material is a fluoroelastomer and said second elastomeric material is hydrogenated nitrile rubber.

15. The gasket of claim 1 wherein said third elastomeric material is a mixture of fluoroelastomer and hydrogenated nitrile rubber.

16. The gasket of claim 1 wherein said third elastomeric material is further defined as having a tensile strength different than a tensile strength of said first elastomeric material and different than a tensile strength of said second elastomeric material.

17. A gasket for sealing multiple fluids comprising:
a carrier having a plurality of fluid openings to be sealed including at least first and second fluid openings;
a first elastomeric material disposed on a first region of said carrier at least partially surrounding said first fluid opening, said first elastomeric material being operable to seal a first fluid;
a second elastomeric material different than said first elastomeric material disposed on a second region of said carrier spaced from said first region and surrounding said second fluid opening and spaced from said first fluid opening, said second elastomeric material being operable to seal a second fluid different than said first fluid; and
a third elastomeric material comprising a blend of said first and second elastomeric materials disposed on a third region of said carrier extending between said first and second regions, said third elastomeric material being operable to seal a third fluid different than said first and second fluids.

18. A gasket as set forth in claim 17 wherein said first elastomeric material is further defined as being operable to seal an air/fuel mixture, said second elastomeric material is further defined as being operable to seal a coolant mixture, and said third elastomeric material is further defined as being operable to seal an oil mixture.

* * * * *